United States Patent [19]

Straus et al.

[11] Patent Number: 5,136,493

[45] Date of Patent: Aug. 4, 1992

[54] HEAT DISSIPATING OUTDOOR LAMP HOLDER

[75] Inventors: Joseph Straus, Woodland Hills; Angel Orellana, Los Angeles, both of Calif.

[73] Assignee: U.S. Pole Company, Inc., Sun Valley, Calif.

[21] Appl. No.: 797,787

[22] Filed: Nov. 25, 1991

[51] Int. Cl.⁵ ............................................. F21V 29/00
[52] U.S. Cl. .................................... 362/373; 362/294; 362/374; 362/431
[58] Field of Search ............... 362/373, 374, 431, 264, 362/265, 294, 221, 218

[56] References Cited

U.S. PATENT DOCUMENTS 4,054,790 10/1977 Slaughter ..................... 362/373 X
4,507,719 3/1985 Quiogue ...................... 362/373 X
4,598,347 1/1986 Peppers ........................... 362/373

Primary Examiner—Stephen F. Husar
Attorney, Agent, or Firm—Christie, Parker & Hale

[57] ABSTRACT

An outdoor lamp holder comprises a housing and a removable, heat conductive component mounting tray. The housing has at least one heat conductive wall and an open front. A door having a window covers the open front. A reflector is mounted in the housing and a lamp socket is mounted in the reflector. A lamp ballast is mounted on the tray. The housing is constructed slidably to receive the tray such that the tray is in heat conductive contact with the heat conductive wall of the housing. Preferably, a slot is formed by a spring bracket that is deflected by the tray to urge the tray against the housing.

4 Claims, 5 Drawing Sheets

HEAT DISSIPATING OUTDOOR LAMP HOLDER

BACKGROUND OF THE INVENTION

This invention relates to outdoor lighting and, more particularly, to a heat dissipating outdoor lamp holder.

Gas, e.g., high pressure sodium, halide, or mercury lamps are commonly used for outdoor lighting. The ballast transformers used to generate the voltage and current required to operate such gas lamps create substantial heat. Conventional outdoor lamp holders are designed with a large ballast chamber to keep the lamp holder cool. The heat is dissipated by the convection currents that circulate in the large volume of air in the chamber.

SUMMARY OF THE INVENTION

An outdoor lamp holder comprises a housing and a removable, heat conductive component mounting tray. The housing has at least one heat conductive wall and an open front. A door having a window covers the open front. A reflector is mounted in the housing and a lamp socket is mounted in the reflector. A lamp ballast is mounted on the tray. The housing is constructed slidably to receive the tray such that the tray is in heat conductive contact with the heat conductive wall of the housing.

Preferably, the tray has a first flat side on which the lamp ballast is mounted and a second flat side joined to the first side at an angle. The housing has four side walls that define the open front. One of the side walls is the heat conductive wall. Adjacent to the heat conductive wall, a slot is formed in the housing to receive the first side of the tray in heat conductive relationship.

In the preferred embodiment, the angle of joinder of the sides of the tray is less than 90 degrees so that the distal end of the first side is spaced a given distance from an imaginary line perpendicular to the second side along the line of joinder, the second side is secured to an internal anchor in the housing in perpendicular relationship to the heat conductive wall, and the slot is deflectable and smaller than the given distance. As a result, the slot is deflected when the second side of the tray is received thereby and the second side is spring biased against the heat conductive wall by the deflection of the slot.

The invention permits an outdoor lamp holder to be adequately cooled with a smaller ballast chamber than the prior art. Efficient conductive heat transfer occurs through the wall of the housing without having to penetrate the housing wall with fasteners.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENT

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

Figure 1:
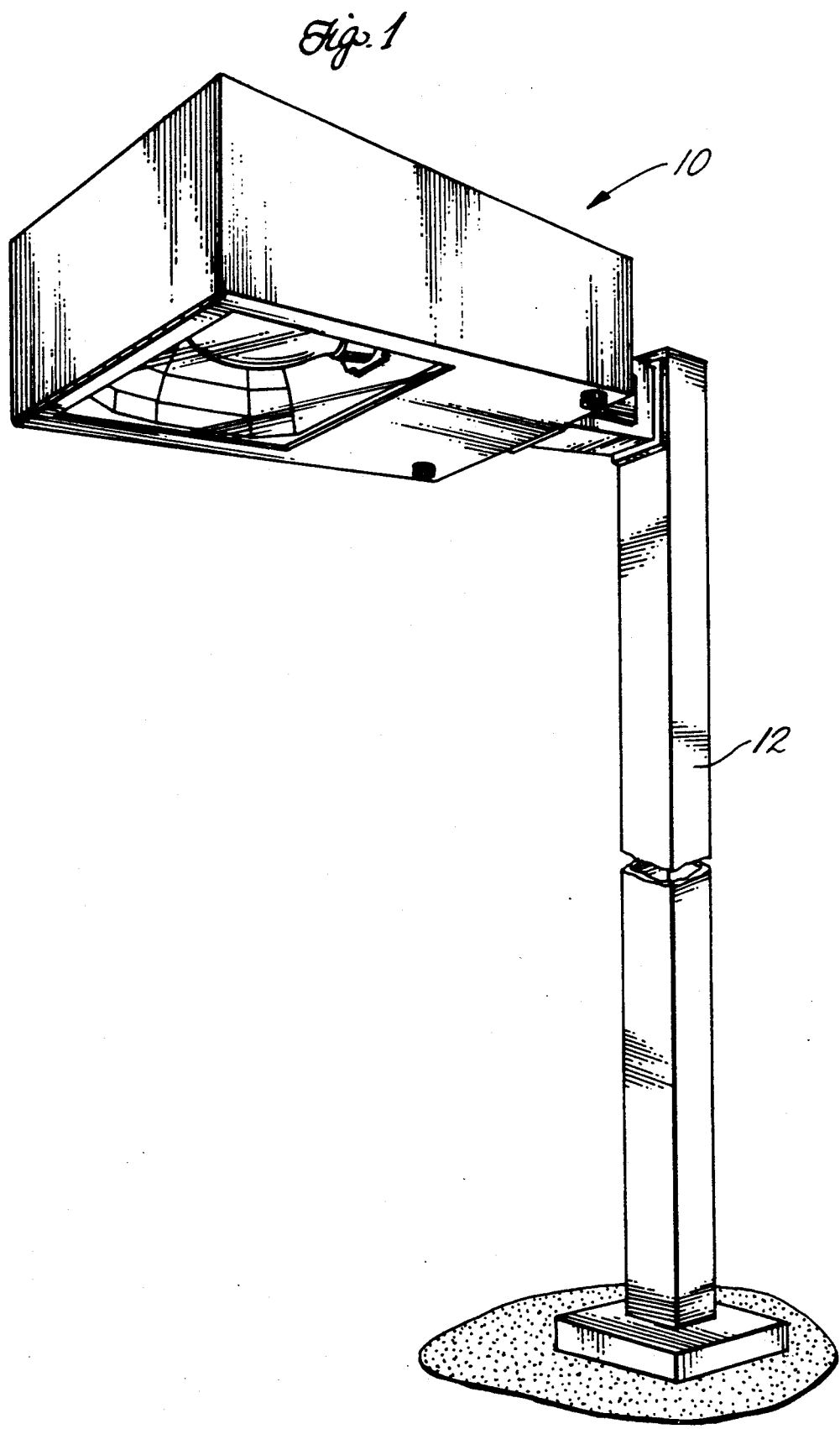
FIG. 1 is a perspective view of an outdoor lamp holder mounted on a pole.
Figure 2:
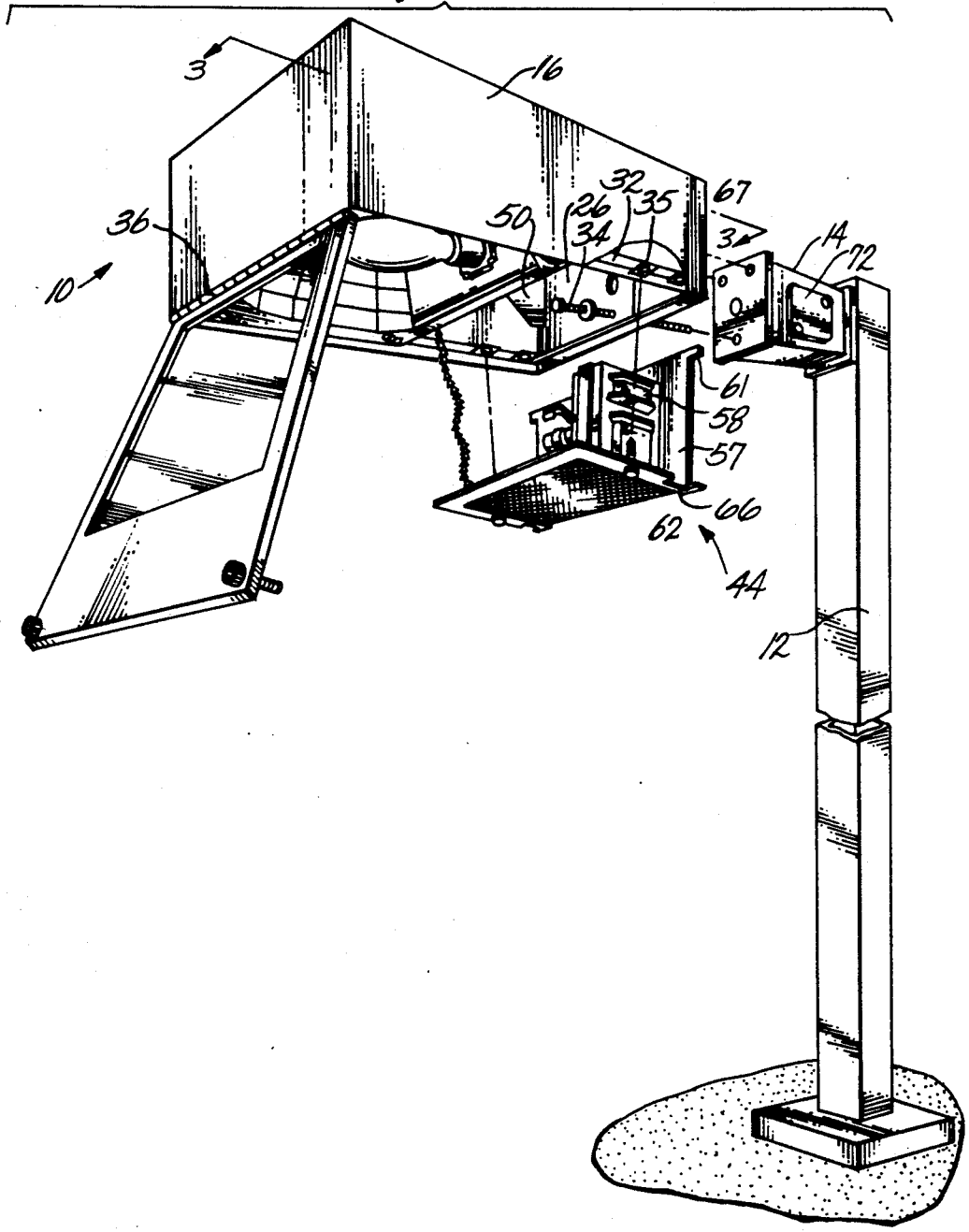
FIG. 2 is a perspective view of the lamp holder of FIG. 1 with the door open and the ballast tray removed to reveal the interior of the lamp holder.
Figure 3:
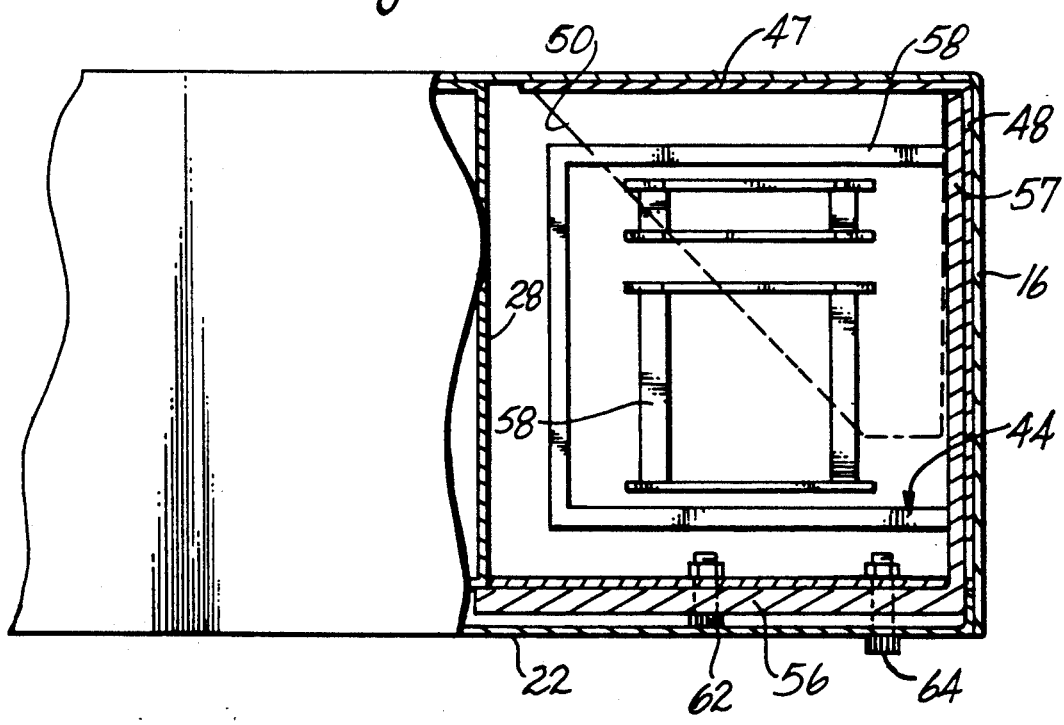
FIG. 3 is a sectional view of the lamp holder of FIG. 1 taken through plane 3—3 in FIG. 2.

In FIG. 1, an outdoor lamp holder 10 is attached to a vertical pole 12 by a mounting bracket 14. Lamp holder 10 comprises a five-sided rectangular housing 16 having two side walls, two end walls, a back wall, an open front 18. A hinged door 20 opens and closes front 18. As shown in FIG. 2, housing 16 is mounted so front 18 faces downward. Door 20 has a window 22 for the transmission of light out of lamp holder 10. The interior of housing 16 is divided by a baffle wall 28 into a lamp chamber 24 adjacent to window 22 and a ballast chamber 26. Mounting flanges 30 and 32 are formed on the interior of housing 16 near open front 18. Flanges 30 and 32 extend perpendicularly from opposite side walls of housing 16. Typically, housing 16 would be made of formed aluminum. The end wall of housing 16 adjacent to chamber 26 is secured by bolts 34 and clip on nuts 35 to pole 12 through bracket 14. Bracket 14 could be permanently attached to housing 16 as by welding if desired. The other end wall of housing 16 is pivotally attached to door 20 by a piano hinge 36. Alternatively, door 20 could be pivotally attached to housing 16 by another type of hinge such as a side hinge with a stop to limit the degree of opening. A reflector 38 is nestled in chamber 24 and attached to flanges 30 and 32 by conventional clips 40. A conventional lamp socket 42 is attached to wall 28 within reflector 38.

Figure 4:
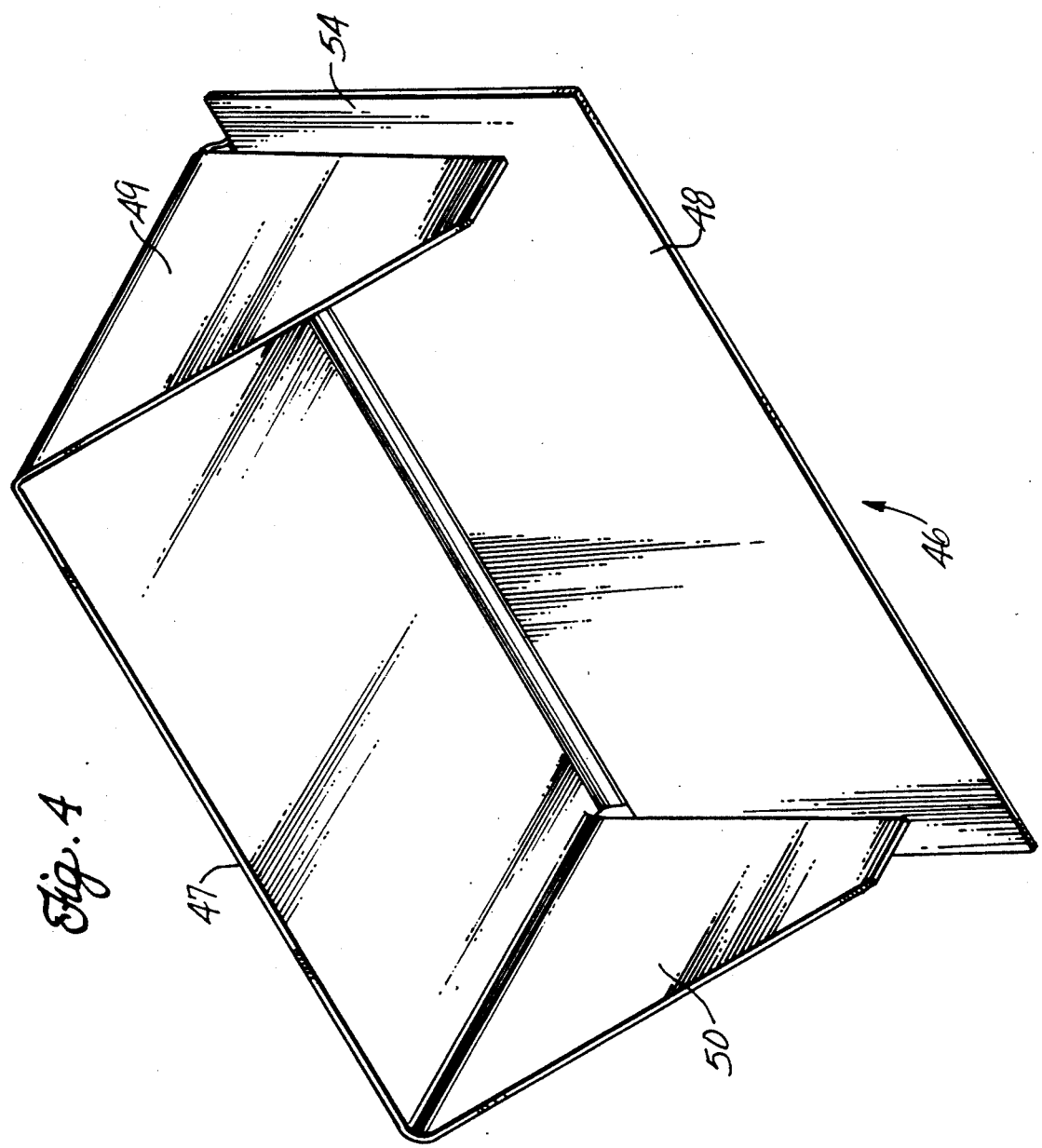
FIG. 4 is a perspective view of the spring bracket removed from the housing.

A two-sided, angled ballast tray 44 and a spring bracket 46 fit in chamber 26. Tray 44 has a knurled tie-down side 56 and a component mounting side 57 to which a ballast transformer 58 and a condenser 60 are secured by straps and or screws. The distal end of side 57 has tabs 59 and 61. As illustrated in FIG. 4, spring bracket 46 has perpendicular, angled sides 47 and 48 and ends 49 and 50 that extend perpendicularly from side 47. Side 47 is permanently attached to the back surface of housing 14 and side 48 is permanently attached to the side of housing 14 adjacent to bracket 14 such as by welding. Ends 49 and 50 have edges 51 and 52, respectively, that are closely spaced from the surface of side 48 to form a slot 54. Tray 44 is made from a good heat conductor such as cast aluminum and is ordinarily relatively rigid. Spring bracket 46 is made of a relatively resilient, heat conductive material such as aluminum sheet metal stock, so ends 49 and 50 can deflect.

Figure 5:
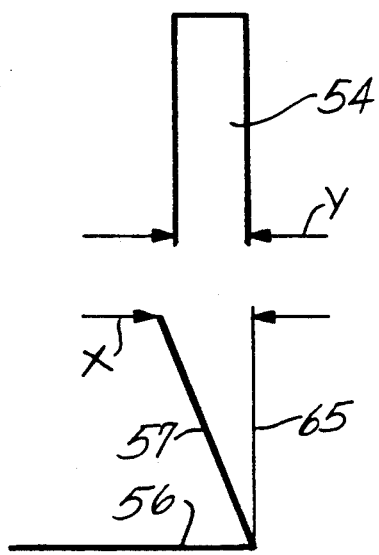
FIG. 5 is a schematic view showing the dimensional relationship between the ballast tray and the spring bracket slot.

Tray 44 is removably to permit serving and replacement of the components mounted thereon. When tray 44 is installed in housing 16, side 57 is wedged into slot 54 between edges 51 and 52 and side 48 and side 56 is secured to flanges 30 and 32 by fasteners 62. To promote good heat conducting contact between tray 44 and housing 16, the angle between sides 56 and 57 is preferably slightly less than 90° and slot 54 preferably narrows toward the back of housing 16. As a result, when side 56 is secured to flanges 30 and 32, side 57 angles away from side 56 in such a fashion that it is slightly wider than slot 54. This is illustrated schematically in FIG. 5. As shown, the angle of joinder of the sides of the tray is slightly greater than 90 degrees so that the distal end of the side 57 is spaced a distance X from an imaginary plane 65 perpendicular to side 56 along the line of joinder. Slot 54 has a width Y that is smaller than distance X. As side 57 enters slot 54 and side 56 is secured in perpendicular relationship to side 48 and the side wall of housing 16 to which it is attached, edges 51 and 52 deflect somewhat to accommodate side 57. The spring force caused by the deflection of edges 51 and 52 urges side 57 of tray 44 into intimate heat conducting contact with side 48 of spring bracket 46 and the inner surface of the side wall of housing 14 connected to bracket 18. Accordingly, heat generated by ballast transformer 58 is efficiently transferred through tray 44 to housing 16 without a need for external fasteners. From there the heat is transferred by radiation and convection to the ambient atmosphere through the large surfaces of housing 16. As a result, the heat generated by transformer 58 is dissipated and lamp holder 10 is effectively cooled without requiring a large ballast chamber.

Door 20 is secured to flanges 30 and 32 by fasteners 64 and clip on nuts 67. Notches 66 are formed on side 56 to expose flanges 30 and 32 to fastener 64.

High voltage electrical wires connect socket 42 to transformer 58 and condenser 60. Wires from the latter pass through openings in housing 14 to bracket 18. There they are spliced to wires from the interior of pole 12 carrying standard line voltage. The splices are made through an access opening covered by a plate 72.

To remove tray 44, fasteners 64 are removed, door 20 is swung open, and fasteners 62 are removed. Tabs 59 and 61 are spaced apart a distance greater than the distance between flanges 30 and 32. This prevents tray 44 from accidentally falling on maintenance personnel working on the lamp holder because tray 44 must be turned so tabs 59 and 61 exit open front 18 diagonally.

For additional safety, a chain 74 secures tray 44 to baffle wall 28.

What is claimed is:

1. An outdoor lamp holder comprising:
   a housing having at least one heat conductive wall and an open front;
   a door covering the open front;
   a window in the door;
   a reflector mounted in the housing;
   a lamp socket mounted in the reflector;
   a heat conductive component mounting tray;
   ballast means mounted on the tray; and
   means associated with the housing for slidably receiving the tray such that the tray is in heat conductive contact with the heating conducting wall of the housing.

2. The lamp holder of claim 1, in which the tray has a first flat side on which the ballast means are mounted and a second flat side joined to the first side at an angle, the housing has four side walls that define the open front, one of the side walls being the heat conductive wall, and the receiving means comprises means defining adjacent to the heat conductive wall a slot for receiving the first side and means for securing the second side to the housing.

3. The lamp holder of claim 2, in which the angle of joinder of the sides is slightly less than 90 degrees so that the periphery of the first side is spaced a given distance from an imaginary line perpendicular to the second side along the line of joinder, the second side is secured to the housing in perpendicular relationship to the heat conductive wall and the slot is deflectable and smaller than the given distance so that the slot is deflected when the second side is received thereby and the second side is spring biased against the heat conductive wall as the slot is deflected.

4. The lamp holder of claim 1, in which the receiving means spring biases the tray against the heat conductive wall.

* * * * *